March 21, 1933.  J. M. LARSON  1,902,173
HUMIDITY CONTROLLER
Filed July 14, 1930
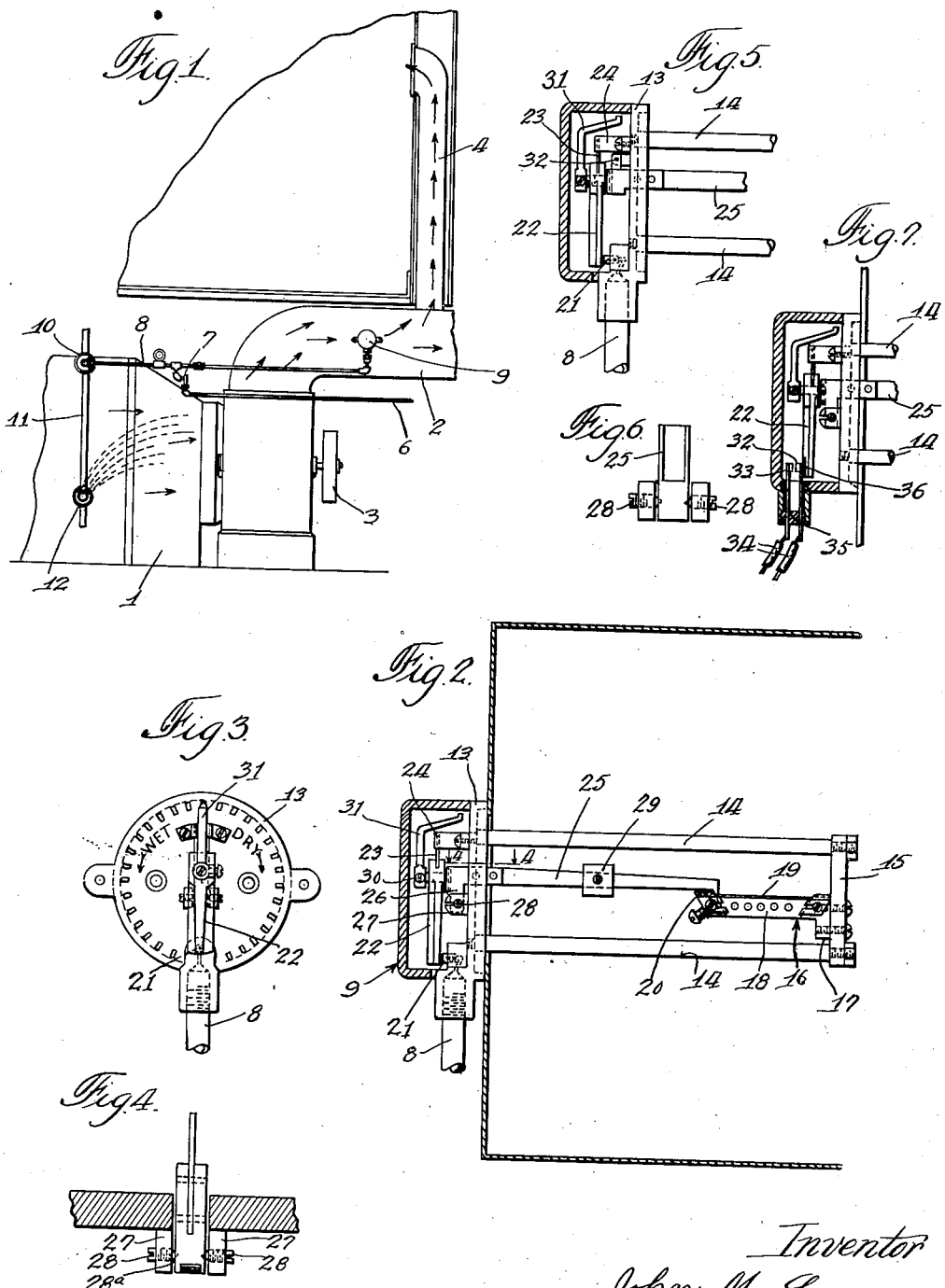
Inventor
John M. Larson
By Jones, Addington, Ames & Seibold
Attys
Witness
David S. Magnusson Patented Mar. 21, 1933

1,902,173

UNITED STATES PATENT OFFICE

JOHN M. LARSON, OF CHICAGO, ILLINOIS, ASSIGNOR TO NATIONAL REGULATOR CO., OF CHICAGO, ILLINOIS, A CORPORATION OF ILLINOIS

HUMIDITY CONTROLLER

Application filed July 14, 1930. Serial No. 467,698.

The invention relates to improvements in means for regulating the amount of moisture in the air of buildings in which it is desirable to regulate the humidity of the air.

More particularly, this invention relates to a humidity controller comprising a hygrostatic element placed in an air stream, such as a ventilating duct, to regulate the humidity of the air passing therethrough. When affected by moisture in the air, the hygrostatic element moves a lever which, in turn, actuates a valve for opening and closing an airport located outside the air stream to be regulated. The air line to which the airport is connected is also connected to a diaphragm valve which controls the amount of moisture emitted into the air stream. Thus, as the airport is opened or closed by the action of the hygrostatic element, the diaphragm valve is operated and the moisture in the air stream is regulated as desired.

An object of this invention is to provide a humidity controller for regulating the moisture content of air in buildings.

A further object of this invention is to provide a humidity controller in which the airport is situated so as to be protected from dirt and foreign matter carried by the air to be regulated.

A still further object of this invention is to prevent condensation of the compressed air in the nozzle of the airport and the destructive corrosion caused thereby. Ordinarily the whole regulator is placed in the duct of a ventilating system. The temperature of the air in the duct is rather cool while the temperature of the compressed air emitted from the air port is considerably warmer. Therefore, the cooler air condenses the moisture in the condensed air at the nozzle of the airport which causes corrosion at this point and thereby prevents efficient operation of the regulator. In the present device the airport is situated outside of the duct of the ventilating system and does not come in contact with the cool air which causes the condensation.

A still further object of this invention is to provide a humidity controller which is not affected by a change in temperature but only by a change in the relative humidity of the air.

Further objects and advantages will be apparent from the following description when taken together with the accompanying drawing in which latter:

Figure 1 is an elevational view of a ventilating system with a humidity controller embodying the present invention attached to a ventilating duct;

Fig. 2 is a side elevational view partly in section of a humidity controller attached to a ventilating duct;

Fig. 3 is a front elevational view of the humidity controller with the casing removed;

Fig. 4 is a horizontal cross sectional view taken on the line 4—4 of Fig. 2;

Fig. 5 is a modified form of humidity controller;

Fig. 6 is a top plan view of the pivotal connection of the lever employed in the modified form shown in Fig. 5; and Fig. 7 is a modified form of the humidity controller shown in Fig. 2.

Referring more particularly to the drawing, the construction shown comprises an air intake 1 connected to a ventilating duct 2 having a fan 3 in the bottom end thereof for forcing the air through the ventilating system. A pipe 4 carries the air from the ventilating duct to the various rooms. An air line 6 having a restriction 7 therein is connected to the line 8 which, in turn, connects the humidity controller 9 to the diaphragm valve 10. The diaphragm valve 10 controls the passage of the liquid through the pipe 11. A vaporizer or steam injector 12 is attached to the pipe 11 beyond the diaphragm valve 10 and ejects the water or steam into the air in the air intake 1.

The humidity controller as shown in Fig. 2 comprises a plate or base member 13 which is adapted to be attached to the outside of a ventilating duct by screws or any other means desired. A framework comprising top and bottom members 14 and a rear member 15 which is connected between the top and bottom members 14 at their inner ends extends to the rear of the plate 13. The members 14 are attached to the rear side of the plate 13 and extend into the ventilating duct. A hygrostatic element 16 is secured at the inner end to a supporting member 17 which is attached to the end member 15 by means of screws. The hygrostatic element 16 is adapted to extend outwardly in a horizontal position from the rear member 15 and comprises a strip of wood 18 cut so that the grain runs crosswise of the strip and a strip of brass or other suitable material 19 which extends along the top of the wood strip 18. A securing plate 20 is positioned over the free end of the hygrostatic element which holds the strip of wood 18 and the strip of metal 19 securely together.

An airport 21 which is connected to the compressed air line 8 is attached to the plate 13 at the lower part thereof. A valve 22 is hung in front of the airport 21 by means of a strip 23 of resilient metal. The end of the strip 23 is attached to a block 24 which is secured to the upper part of the base or plate 13. The resilient strip 23 has a slight tendency to urge the valve 22 against the nozzle of the airport 21. A lever 25 having a downwardly extending portion 26 is pivoted to the plate or base member 13 by means of screws extending through projecting members 27 of the plate 13 and seating into spots 28 in the projecting portion 26 of the lever 25. When thus mounted one end of the lever extends into the duct through an opening in the plate and rests upon the free end of the hygrostatic element 16. As the lever 25 is pivoted adjacent its outer end, the weight of the inner end is sufficient to hold it always in contact with the hygrostatic element 16. But in order to regulate the amount of force exerted downwardly at the inner end of the lever 25, a weight 29 is slidably mounted on the lever 25 and may be moved inwardly or outwardly according to the amount of pressure it is desired to exert downwardly at the inner end of the lever 25. A screw 30 is threaded through the valve 22 and projects out beyond the valve lying adjacent the outer end of the lever 25. An adjusting handle 31 is fixedly attached to the outer end of the screw 30 so that by moving the handle 31 in one direction the screw 30 will urge the valve 22 away from the airport 21 and when the handle 31 is rotated in the opposite direction the metal strip 24 urges the valve 22 more strongly against the airport 21.

The operation of the humidity controller above described is as follows:

Ordinarily the hygrostatic element 16 is substantially horizontal with the inner end of the lever 25 resting thereon so positioned that the outer end of the lever 25 does not prevent the valve 22 from closing the airport 21. When the airport 21 is closed the air from the air line is put under a pressure and tends to open the diaphragm valve 10 which is spring-closed and pressure-opened. When the diaphragm valve 10 is opened, vapor is ejected from the vaporizer 12 into the air stream, thus increasing the humidity of the air. When the air which has been affected by the vaporizer reaches the hygrostatic element 16, the moisture in the air causes the wood strip 18 to absorb part of this moisture and expand. As the metal strip 19 is not affected by the moisture the hygrostatic element 16 is bent upwardly so that its free end forces the inner end of the lever 25 upwardly also. This action causes the outer end of the lever 25 to engage the end of the screw 30, thereby opening the airport 21. When the airport 21 is opened, the pressure in the pipes 6 and 8 is reduced to normal and the spring therefor closes the diaphragm valve, preventing any more moisture from being injected into the air stream. Of course, it is evident that the lever 25 may be so moved as to only partially open or close the airport 21, in which case the vapor injected into the air stream by the vaporizer 12 will be only partially cut down or increased.

The humidity controller shown in Fig. 5 is substantially the same as that shown in Fig. 2 with this difference, that the lever 25 is provided with an upwardly projecting portion 32 by which it is pivoted to the plate 13 instead of the downwardly extending projection 26 of Fig. 2. With this difference in the pivotal mounting of the lever 25 the action of the humidity controller is reversed, an increase in the moisture in the air tending to actuate the lever 25 so that the valve 22 closes the airport 21. In this construction, therefore, it is necessary to use a reverse-acting diaphragm valve, that is, one which is spring-opened and pressure-closed.

With the above-described arrangement the airport will be protected from dirt and foreign matter carried by the air to be regulated and corrosion will be prevented.

The construction of the humidity controller shown in Fig. 7 is somewhat similar to the construction of the humidity controller shown in Fig. 2 except that contact members which are electrically connected to a solenoid valve are employed in place of the air port and the diaphragm valve. The arm 22 controlled by the lever 25 acts on a flexible contact member 32 movable into and out of engagement with respect to another flexible contact member 33, these contact members being connected with the wires 34 of the solenoid circuit for operating a solenoid valve which would be employed in place of the diaphragm valve 10 as shown in Figure 1. These contacts 32 and 33 may be mounted in a suitable insulating block 35 and a suitable piece of insulating 36 may be provided on the oscillatable arm 22 where it engages the flexible contact member 32. Thus, the construction shown in Fig. 7 is substantially the same as that shown in Fig. 2 with the exception that in place of the airport 21 and the diaphragm valve controlled thereby to regulate the moisture injected into the air stream, the contacts 32 and 33 control the solenoid valve which would be used in place of the diaphragm valve 10 and for the same purpose.

While I have shown and described but two embodiments of the present invention, it will be apparent to those skilled in the art that various modifications thereof may be made without departing from the spirit and scope of this invention and, therefore, I wish to be limited only by the scope of the prior art and the appended claims.

I claim:

1. A humidity controller comprising a horizontally extending hygrostatic element secured at one end in a substantially horizontal position within an air duct, an air port for controlling a diaphragm valve secured to a plate attached to the outer side of said duct, a valve member for opening and closing said air port suspended from said plate in front of said air port, adjusting means extending through said valve member, a lever having a projecting portion adjacent one end, said projecting portion being pivotally mounted to said plate so that the actuating end of said lever engages the end of said adjusting means and the free end of said lever extends inwardly into said duct and engages the upper side of the free end of said hygrostatic element, whereby movement of said hygrostatic element pivots said lever and operates said valve member.

2. A humidity controller comprising a horizontally extending hygrostatic element secured at one end in a substantially horizontal position within an air duct, an air port for controlling a diaphragm valve secured to a plate attached to the outer side of said duct, a valve member for opening and closing said air port suspended from said plate in front of said air port, a screw threaded into and extending through said valve member toward said duct, a lever having a downwardly extending portion adjacent one end, said downwardly extending portion being pivotally mounted to said plate so that the actuating end of said lever engages the end of said screw and the free end extends inwardly into said duct through an opening in said plate and engages the upper side of the free end of said hygrostatic element, the weight of said lever keeping the free end thereof in engagement with said hygrostatic element, whereby movement of said hygrostatic element pivots said lever and operates said valve member.

3. A humidity controller comprising a hygrostatic element secured at one end within an air duct, means secured to a supporting member outside said duct for actuating a moisture controlling valve, an arm resiliently suspended from said supporting member for operating said means, and a lever pivotally mounted on said supporting member and having one end engaging the free end of said hygrostatic element, whereby movement of said hygrostatic element pivots said lever and operates said arm.

4. A humidity controller comprising a hygrostatic element secured at one end within an air duct, means secured to a supporting member outside said duct for actuating a moisture controlling valve, an arm resiliently suspended from said supporting member for operating said means, adjusting means extending through said arm, a lever having a projecting portion adjacent one end, said projecting portion being pivotally mounted on said supporting member so that the actuating end of said lever engages the end of said adjusting means and the free end of said lever extends inwardly into said duct and engages the free end of said hygrostatic element, whereby movement of said hygrostatic element pivots said lever and operates said arm.

5. A humidity controller comprising a horizontally extending hygrostatic element secured at one end in a substantially horizontal position within an air duct, means secured to a supporting member outside said duct for actuating a moisture controlling valve, an arm resiliently suspended from said supporting member for operating said means, an adjusting screw threaded into and extending through said valve member toward said duct, a lever having a downwardly extending portion adjacent one end, said downwardly extending portion being pivotally mounted on said supporting member so that the actuating end of said lever engages the end of said screw and the free end thereof extends inwardly into said duct and engages the upper side of the free end of said hygrostatic element, the weight of said lever maintaining the free end thereof in engagement with said hygrostatic element, whereby movement of said hygrostatic element pivots said lever and operates said arm.

6. The combination with an air duct having an opening in its wall, of moisture-controlling means for said duct, comprising a base covering said opening, a hygrostatic element inside said duct mounted on said base, a valve seat and valve therefor for controlling the humidity controller outside said duct mounted on said base, and transmission from said hygrostatic element to said valve mounted on said base that part of the moisture controlling means mounted on the base and lying within the duct being readily insertable and removable through said opening while assembled on said base whereby the moisture controlling means may be readily installed with respect to the duct as a unit.

7. The combination with an air duct having an opening in its wall, of moisture-controlling means for said duct, comprising a base covering said opening, a hygrostatic element inside said duct mounted on said base, a valve seat and valve therefor for controlling the humidity controller outside said duct mounted on said base, and transmission from said hygrostatic element to said valve mounted on said base comprising a lever that part of the moisture controlling means mounted on the base and lying within the duct being readily insertable and removable through said opening while assembled on said base whereby the moisture controlling means may be readily installed with respect to the duct as a unit.

8. The combination with an air duct having an opening in its wall, of moisture-controlling means for said duct, comprising a base covering said opening, a hygrostatic element inside said duct mounted on said base, a valve seat and valve therefor for controlling the humidity controller outside said duct mounted on said base, and transmission from said hygrostatic element to said valve mounted on said base comprising a lever and a screw adjustment between said lever and valve that part of the moisture controlling means mounted on the base and lying within the duct being readily insertable and removable through said opening while assembled on said base whereby the moisture controlling means may be readily installed with respect to the duct as a unit.

9. The combination with an air duct having an opening in its wall, of moisture controlling means for said duct comprising a base covering said opening, a hygrostatic element inside said duct mounted on said base, a flow controller for controlling the moisture supplying means, said flow controller being outside said duct and mounted on said base, and transmission from said hygrostatic element to said flow controller mounted on said base, that part of the moisture controlling means mounted on the base and lying within the duct being readily insertable and removable through said opening while assembled on said base whereby the moisture controlling means may be readily installed with respect to the duct as a unit.

10. The combination with an air duct having an opening in its wall, of moisture controlling means for said duct comprising a base covering said opening, a hygrostatic element inside said duct mounted on said base, a flow controller for controlling the moisture supplying means, said flow controller being outside said duct and mounted on said base, and transmission from said hygrostatic element to said said flow controller mounted on said base, that part of the moisture controlling means mounted on the base and lying within the duct being readily insertable and removable through said opening while assembled on said base whereby the moisture controlling means may be readily installed with respect to the duct as a unit, said flow controller comprising two elements movable into and out of contact with each other for controlling the flow.

11. The combination with an air duct having an opening in its wall, of moisture controlling means for said duct comprising a base covering said opening, a support mounted on said base and extending inwardly into the duct, a flexible hygrostatic element carried by said support, a flow controller for controlling the moisture supplying means, said flow controller being outside said duct and mounted on said base, and transmission from said hygrostatic element to said flow controller comprising a lever mounted on said base.

12. The combination with an air duct having an opening in its wall, of moisture controlling means for said duct comprising a base covering said opening, a support mounted on said base and extending inwardly into the duct, a flexible hygrostatic element carried by said support, a flow controller for controlling the moisture supplying means, said flow controller being outside said duct and mounted on said base, and transmission from said hygrostatic element to said flow controller comprising a lever mounted on said base, said flow controller comprising two elements movable into and out of contact with respect to each other for controlling the flow.

In witness whereof, I have hereunto subscribed my name.

JOHN M. LARSON.